US009652753B2

(12) United States Patent
Caldwell

(10) Patent No.: US 9,652,753 B2
(45) Date of Patent: May 16, 2017

(54) AUTOMATED DETECTION AND MIGRATION OF AUTOMATED TRANSACTIONS

(71) Applicant: MX Technologies, Inc., Lehi, UT (US)

(72) Inventor: John Ryan Caldwell, Provo, UT (US)

(*) Notice: Subject to any disclaimer, the term of this patent is extended or adjusted under 35 U.S.C. 154(b) by 0 days.

(21) Appl. No.: 14/971,717

(22) Filed: Dec. 16, 2015

(65) Prior Publication Data
US 2016/0217440 A1 Jul. 28, 2016

Related U.S. Application Data

(63) Continuation of application No. 13/986,538, filed on May 14, 2013, now abandoned.

(51) Int. Cl.
| | |
|---|---|
| *G06Q 40/00* | (2012.01) |
| *G06Q 20/10* | (2012.01) |
| *G06Q 30/02* | (2012.01) |
| *G06Q 40/02* | (2012.01) |
| *G06Q 20/26* | (2012.01) |
| *G06Q 20/42* | (2012.01) |

(52) U.S. Cl.
CPC ......... *G06Q 20/102* (2013.01); *G06Q 20/26* (2013.01); *G06Q 20/42* (2013.01); *G06Q 30/0207* (2013.01); *G06Q 40/02* (2013.01)

(58) Field of Classification Search
CPC ....... G06Q 40/00; G06Q 20/10; G06Q 20/102
USPC .............................................. 705/35, 39, 40
See application file for complete search history.

(56) References Cited

U.S. PATENT DOCUMENTS

| | | |
|---|---|---|
| 7,185,104 B1 | 2/2007 | Thorup et al. |
| 7,266,602 B2 | 9/2007 | Givoly |
| 7,546,945 B1 | 6/2009 | Bucci et al. |
| 7,792,717 B1 | 9/2010 | Hankins et al. |
| 8,001,040 B2 | 8/2011 | Keithley |
| 8,051,017 B2 | 11/2011 | Munson et al. |
| 8,086,528 B2 | 12/2011 | Barrett et al. |
| 8,447,025 B2 | 5/2013 | Shaffer et al. |

(Continued)

OTHER PUBLICATIONS

United States Patent and Trademark Office, Office Action, Dec. 3, 2015, 29 pages, in U.S. Appl. No. 14/036,951.

(Continued)

*Primary Examiner* — Lalita M Hamilton
(74) *Attorney, Agent, or Firm* — Kunzler Law Group

(57) ABSTRACT

Automated detection and migration of automated transactions. In one example embodiment, a method may include providing automated transaction migration software running on a first computer of a new account provider to a customer. The software may cause the first computer to search through transactions of an old account of an old account provider on a second computer of the old account provider to automatically detect an automated transaction of the customer, gather transaction data associated with the automated transaction from the second computer, store the transaction data in an identified transaction database of the first computer, and in response to the automatic detection of the automated transaction, proactively display at least a portion of the transaction data to the customer and proactively prompt the customer to authorize migration of the automated transaction from the old account provider to the new account provider.

20 Claims, 2 Drawing Sheets

(56) References Cited

U.S. PATENT DOCUMENTS

| | | | | |
|---|---|---|---|---|
| 8,458,064 B1* | 6/2013 | Dobbins | ............... | G06Q 40/00 705/35 |
| 8,924,288 B1* | 12/2014 | Easley | ................. | G06Q 40/02 705/35 |
| 2003/0055723 A1* | 3/2003 | English | ................. | G06Q 30/02 705/14.51 |
| 2003/0130916 A1 | 7/2003 | Block et al. | | |
| 2005/0234824 A1 | 10/2005 | Gill et al. | | |
| 2006/0116949 A1 | 6/2006 | Wehunt et al. | | |
| 2007/0100748 A1 | 5/2007 | Dheer et al. | | |
| 2010/0100470 A1 | 4/2010 | Buchanan et al. | | |
| 2010/0250416 A1 | 9/2010 | Hazlehurst | | |
| 2011/0107265 A1 | 5/2011 | Buchanan et al. | | |
| 2011/0238620 A1 | 9/2011 | Ramineni et al. | | |
| 2011/0276414 A1 | 11/2011 | Subbarao et al. | | |
| 2012/0054095 A1* | 3/2012 | Lesandro | ............... | G06Q 20/10 705/39 |
| 2013/0046661 A1 | 2/2013 | Levin | | |
| 2014/0095389 A1 | 4/2014 | Caldwell | | |
| 2014/0344029 A1 | 11/2014 | Caldwell | | |

OTHER PUBLICATIONS

United States Patent and Trademark Office, Office Action, Dec. 3, 2014, 16 pages, in U.S. Appl. No. 13/986,538.

United States Patent and Trademark Office, Final Office Action, Jun. 16, 2015, 13 pages, in U.S. Appl. No. 13/986,538.

Mary Knobloch, "Banks Community interest pays for all: Bank takes community into account", Mar. 31, 1976, 2 pages, Chicago Tribune.

United States Patent and Trademark Office, Office Action, Nov. 7, 2014, 15 pages, in U.S. Appl. No. 14/036,957.

United States Patent and Trademark Office, Final Office Action, Mar. 26, 2015, 18 pages, in U.S. Appl. No. 14/036,957.

United States Patent and Trademark Office, Office Action, Nov. 19, 2015, 18 pages, in U.S. Appl. No. 14/036,957.

U.S. Appl. No. 14/036,957 Notice of Allowance mailed Oct. 5, 2016.

U.S. Appl. No. 14/036,957 Final Office Action mailed Apr. 21, 2016.

* cited by examiner

AUTOMATED DETECTION AND MIGRATION OF AUTOMATED TRANSACTIONS

FIELD

The embodiments disclosed herein relate to automated detection and migration of automated transactions.

BACKGROUND

In the prior art, many persons have been using computing devices such as desktop computers, laptop computers, notebook computers, smart phones, etc. ("computing devices") to perform personal financial management functions ("PFM"). PFM can include tracking accounts at various financial institutions ("FI's"), accessing accounts at various FI's, budgeting, check deposit, direct deposit, etc. Specialized software was developed to address some of these various functions.

In U.S. Pat. No. 8,392,300 entitled "Method and system for transferring bill payment data", details of transferring bill payment information are provided. A user identifies his/her current financial institution and provides authentication data associated with the current online account system. The current online account system is then accessed using the user-provided current online account system authentication data. The user is provided the opportunity to select what portions of the data are to be transferred to a bill payment feature, and/or recurring bill payment feature, of a new online account system. The selected data is then transferred to the bill payment feature, and/or recurring bill payment feature, of the new online account system. This appears to be a tedious manual system whose awkward, cumbersome and time-consuming nature would tend to discourage its use.

In U.S. Pat. No. 8,352,365 entitled "System and method for electronic bill presentment using a third party", a method and system for electronic bill presentment and payment (EBPP) using a third party intermediary is described. A third party provides an electronic post office that uses a virtual address directory to provide a level of abstraction in an EBPP data stream using the ACH network so that EBPP participants do not require the information that is typically required to process such transactions. By using the virtual address directory, neither the biller, nor the bank, nor the intermediary have all the consumer data used in the transaction. Accordingly, privacy is enhanced and any risk that privacy will be compromised is reduced. However, nothing about this system appears to be proactive in nature.

In U.S. Pat. No. 8,275,710 entitled "Systems and methods for automatic bill pay enrollment", scans a paper bill into a digital image, recognizes information on the digital image, and then uses at least some of the recognized information to enroll a payee into a bill pay system. That invention, although valuable in a world converting from paper to electronic transactions, does not perform functions for pro-actively enrolling users in a bill pay system.

In U.S. Pat. No. 8,095,462 entitled "Dynamic enrollment control system, method and computer program product" discloses an enrollment control system for activating and deactivating enrollment of beneficiaries of a first entity in a service program, such as a bill pay service program, of a second entity. The system requests information from the second entity identifying beneficiaries enrolled in the program and the timing of services provided to the beneficiaries. A request is sent to the second entity to deactivate enrollment of beneficiaries who have not received services within a dormancy threshold time. Advantageously, no enrollment charges are incurred by the first entity for dormant beneficiaries not recently availing themselves of the second entity's services. Optionally, the system can monitor unfulfilled service requests and remove the corresponding beneficiaries from the deactivation request to avoid deactivating enrollment of a customer needing services. Further, the system detects new requests made by beneficiaries for services from the first entity and requests reactivation of the beneficiaries' accounts by the second entity.

In U.S. Pat. No. 7,856,386 entitled "Host exchange in bill paying services" discloses an account exchange system from Yodlee, Inc. The account exchange system is provided by a data aggregation service enabled for gathering data for a subscriber from a data repository of a first financial institution, using account exchange software operating on a server coupled to the data aggregation service. Initiated by a subscriber the account exchange software causes an account to be terminated at the first financial institution and a new account to be opened at a second financial institution, using data from the first financial institution, and processing the data to be compatible with data requirements at the second financial institution. Thus a simple transfer of account data is achieved.

In U.S. Pat. No. 7,783,567 entitled "Bill payment migration", a method and system for migrating transactions, such as bill payment transactions, between payment modules and/or payment processors is disclosed. Each payment object is set up with payment information input to a payment module and results in one or more transactions. During a selective migration, each transaction is treated separately, based on a state of the transaction. A transaction that has either not yet been submitted, or has been completed can be migrated directly, while a transaction that is in some state of processing is iteratively migrated as it completes processing.

A United States Patent Application published as document no. 20120278148 and entitled "Systems, Devices, and/or Methods for Managing Consumer Finances" discloses advertising to consumers through financial management software. According to an exemplary embodiment, the My Life Cost system and method includes a budgeting and business marketing software application that detects, tracts, stores and analyzes financial transactions of a member to provide financial incentives and influence consumer spending. The My Life Cost system and method monitor the amount of money, credit or budgeted category that a member has available to spend on specific merchandise and services. Still according to other exemplary examples, the My Life Cost method and system provides marketing services to qualified businesses on a commission basis without any required upfront costs or any additional advertising fees. In further exemplary embodiments, the My Life Cost system and method includes on-line reports or notifications to a communications device that may be customized for each member and for each participating merchant or business.

A United States Patent Application published as document no. 20100217706 and entitled "Bill Payment Management" from Bank of America discloses methods, systems, and/or computer program products for bill payment management, including determining a periodic payment amount for a customer based on at least one bill of the customer. The periodic payments are periodically charged to the customer by an entity and the entity pays the bill(s) from an account.

However, none of the prior art documents disclose an invention that satisfies the objects, features and advantages of the present invention, as briefly summarized below and as legally defined in the appended claims.

SUMMARY

In general, example embodiments relate to automated detection and migration of automated transactions.

In one example embodiment, a method for automated detection and migration of automated transactions may include providing automated transaction migration software running on a first computer of a new account provider to a customer. The software may cause the first computer to search through transactions of an old account of an old account provider on a second computer of the old account provider to automatically detect an automated transaction of the customer, gather transaction data associated with the automated transaction from the second computer, store the transaction data in an identified transaction database of the first computer, in response to the automatic detection of the automated transaction, proactively display at least a portion of the transaction data to the customer and proactively prompt the customer to authorize migration of the automated transaction from the old account provider to the new account provider, in response to receiving authorization from the customer to migrate the automated transaction from the old account provider to the new account provider, automatically pre-populate a switched transaction database of the first computer with the transaction data from the identified transaction database, and periodically compare the identified transaction database to the switched transaction database to verify that all transaction data contained in the switched transaction database is associated only with transactions that were indeed authorized for migration by the customer.

In another example embodiment, a method for automated detection and migration of automated transactions may include providing automated transaction migration software running on a first computer of a new account provider to a customer. The software may cause the first computer to search through transactions of an old account of an old account provider on a second computer of the old account provider to automatically detect an automated transaction of the customer, gather transaction data associated with the automated transaction from the second computer, store the transaction data in an identified transaction database of the first computer, in response to the automatic detection of the automated transaction, proactively display at least a portion of the transaction data to the customer and proactively prompt the customer to authorize migration of the automated transaction from the old account provider to the new account provider, in response to receiving authorization from the customer to migrate the automated transaction from the old account provider to the new account provider, automatically pre-populate a switched transaction database of the first computer with the transaction data from the identified transaction database, and periodically compare the identified transaction database to the switched transaction database to verify that all automated transactions that have been authorized for migration by the customer have indeed been migrated by having associated transaction data stored in the switched transaction database.

DETAILED DESCRIPTION

Figure 1:
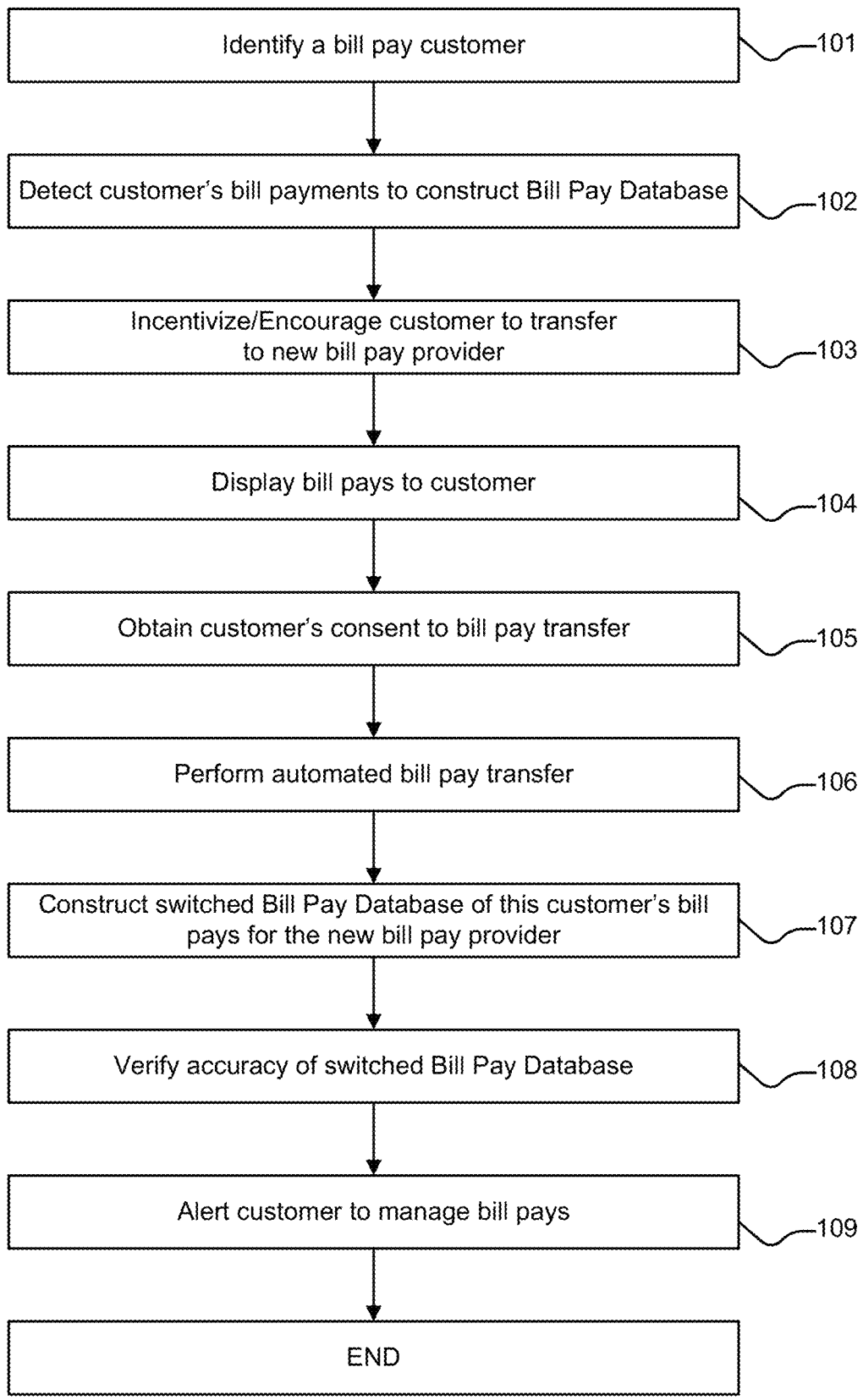
FIG. 1 depicts an example of steps that may be performed in one embodiment of the invention.

Briefly summarized, the invention may be characterized by one or more of the following steps, singly or in combination with any or all of the other listed steps:

Detect accounts for which a customer is using an electronic bill pay service. This is referred to as the "DETECT" step.

Identify all of such accounts to the customer and encourage/incentivize/ask the customer to switch all such bill pay transactions to a new bill pay service provider. This is referred to as the "ENCOURAGE" step.

On a periodic or ongoing basis, review the customer's accounts and verify that all bill pay accounts have been switched to the new bill pay service provider. This is referred to as the "VERIFY" step.

After ENCOURAGE, electronically or automatically facilitate the switch of said customer's bill pay accounts to the new bill pay service provider. This could be performed by pre-populating the customer's account information with the new bill pay service as well as automatically deleting the customer's bill pay accounts with the old bill pay service provider. This is referred to as the "FACILITATE" step.

Many consumers are utilizing PFM software to manage their personal finances, including managing deposits and payments, budgeting, etc. Payments are often handled by electronic bill pay. For example, the consumer or user may set up a function for his/her electric bill to be automatically paid every month from his/her checking account. Automatic payments can be set up for a myriad of financial obligations at nearly any FI.

As a first step, referred to as the "DETECT" step, software running in a computing device will identify all automated bill payments that a customer has established. This can be done in a variety of ways. The software could require the user to enter by hand all account, vendor and bill pay information. However, that would be extremely tedious. Alternatively, the software can search for existing automated bill pay relationships. The software can search past statements from FI's to detect automated bill pay events, and store the data from those events, to create a database of automated bill pays. The software can also determine potential bill pays, direct deposits, key linked accounts, and other financial relationships and store them in a database. For convenience, this will be referred to as the "Bill Pay Database". The Bill Pay Database contains the data which will allow the software to change bill pay providers.

Next, a step referred to as the "ENCOURAGE" step, the software will proactively encourage or incentivize the customer to switch its bill pay relationship from that represented by the data in the Bill Pay Database, to a new bill pay vendor. The new bill pay vendor will take over all bill pay transactions for the consumer. So in the past, the consumer may have had the electric company automatically debit his/her checking account for his/her monthly electric bill, but may have had his/her credit union forward a monthly mortgage payment from another account. That consumer may also have received a salary via direct deposit to another FI, with that account linked to the account from which the mortgage is paid, etc. Some of these relationships can be very complex and confusing to the consumer who is monitoring and managing them.

Using the invention, all such bill pay functions can be consolidated with a single bill pay service. This can increase the volume of business conducted by the bill pay service, and it can simplify the consumer's automated bill pay relationships, monitoring and management.

There are a variety of ways to incentivize or encourage a consumer to switch all (or perhaps just some) automated payment relationships to a new bill pay provider. One proactive way is to simply send a message to the consumer requesting permission to switch all bill pay and other financial relationships to a new bill pay provider. Another would be to offer the consumer a financial incentive to utilize the new bill pay provider, such as interest on money handled, cash back on bills paid, coupons to discounts or free merchandise or services at local or online vendors, etc. However, it is notable that the invention is not operating in a passive manner. The software is not waiting for a user to manually establish or change bill pay relationships. Instead, the software is proactively contacting the consumer, requesting permission to change bill pay relationships, in some way incentivizing the consumer to approve that change, and the software, from its Bill Pay Database, can then automatically make the change.

However, prior to making the bill pay change final, it may be desirable to display each bill pay relationship to the consumer and obtain approval for changing each bill pay relationship. This can help to avoid possible errors or confusion on the part of the consumer. The consumer can be shown each existing bill pay relationship and prompted for approval to switch each relationship to the new bill pay provider, either en masse or individually.

At this point, the invention has searched a consumer's financial records to build a Bill Pay Database of bill pay relationships that could be switched to a new bill pay provider, it has encouraged the consumer to approve switching bill pay relationships to a new bill pay provider, and it has presented to the consumer a list of bill pay relationships that the new bill pay provider will be responsible for.

The third step that the invention can perform as desired is VERIFY. Once a consumer's financial relationships are stored in a Bill Pay Database, and the consumer has been encouraged to switch to a new bill pay provider, it may be desirable to verify that the desired accounts, bill pays or financial relationships have actually been switched to the new bill pay provider. It may also be desirable to repeat the verification process periodically over time.

The software will build a Switched Bill Pay database containing the details and account information for the bill pay relationships that the consumer has approved to be switched to the new bill pay provider. The software can conduct bill pay activities from that Switched Bill Pay database. After the software has paid bills (or whenever it is desired), the software can then verify that the relationships detailed in the Switched Bill Pay database are indeed those that the consumer has approved to be moved to the new bill pay provider. This can be done in a similar way to the DETECT function described above, by first gathering all bill pay relationships. Then those collected bill pay relationships can be compared to the Switched Bill Pay database.

Another step that may be performed in the invention if desired is referred to as FACILITATE. After encouraging the consumer to switch bill pay and other financial relationships to a new bill pay provider, the invention can electronically or automatically facilitate the switch of said customer's bill pay accounts to the new bill pay service provider. This could be performed by pre-populating the customer's account information with the new bill pay service as well as automatically deleting the customer's bill pay accounts with the old bill pay service provider. Facilitating the consumer's migration to a new bill pay provider is likely to prove important to customer satisfaction with the experience.

Without the facilitating step, the user is encouraged to move transactions but left to complete the migration on his/her own. The facilitation may be done in two parts. Rather than having the user complete (manually) all of the migration work on their own (often a significant deterrent to the user to switching), the system provides the user with the option to move forward with completing the migration/transfer such as "click next" to "move this transaction". Then the software will pre-populate data fields with information already available to it. For example, the system can provide the electric company's name and the relevant account number, the customer's name and address, date to pay, etc. The system pre-populates as many fields as possible, leaving the customer with as little data entry burden as possible. The customer is then given the ability to finalize and create the particular bill pay record with the new bill pay provider.

A second part of this step will be to either remind the user to delete the transaction through his/her former bill pay arrangement, or to help facilitate that deletion in some manner, such as through an automated software process.

Referring to FIG. 1, a flow diagram containing an example of steps that may be performed in one embodiment of the invention is depicted. In this example, a computer system identifies a bill pay customer 101 who uses some automated bill pay. For that customer, the computer system then detects the customer's bill payments and constructs a Bill Pay Database 102 of that customer's automated bill pays. The system then incentivizes or encourages the customer to transfer his/her bill pays to a new bill pay provider 103. If the customer consents to a bill pay transfer, then the system displays bill pays from the Bill Pay Database 104 to the customer, and seeks that customer's consent to transfer the accounts in the Bill Pay Database to the new bill pay provider 105. If the customer consents to the transfer of bill pays, then the computer system, at least in part, automatically facilitates transfer of those identified bill pays to the new bill pay provider 106. The system also constructs a Switched Bill Pay Database of this customer's bill pays that have been switched to the new bill pay provider 107. The system verifies the accuracy of the Switched Bill Pay Database and attempts to correct errors or fix problems 108. The system allows the customer to manage his/her bill pays on an ongoing basis through the new bill pay provider. Such a system makes it easy and convenient for a customer to place all bill pays with a single bill pay provider, to add new bill pays in the future, and to otherwise view and manage electronic or automated customer bill pays.

Figure 2:
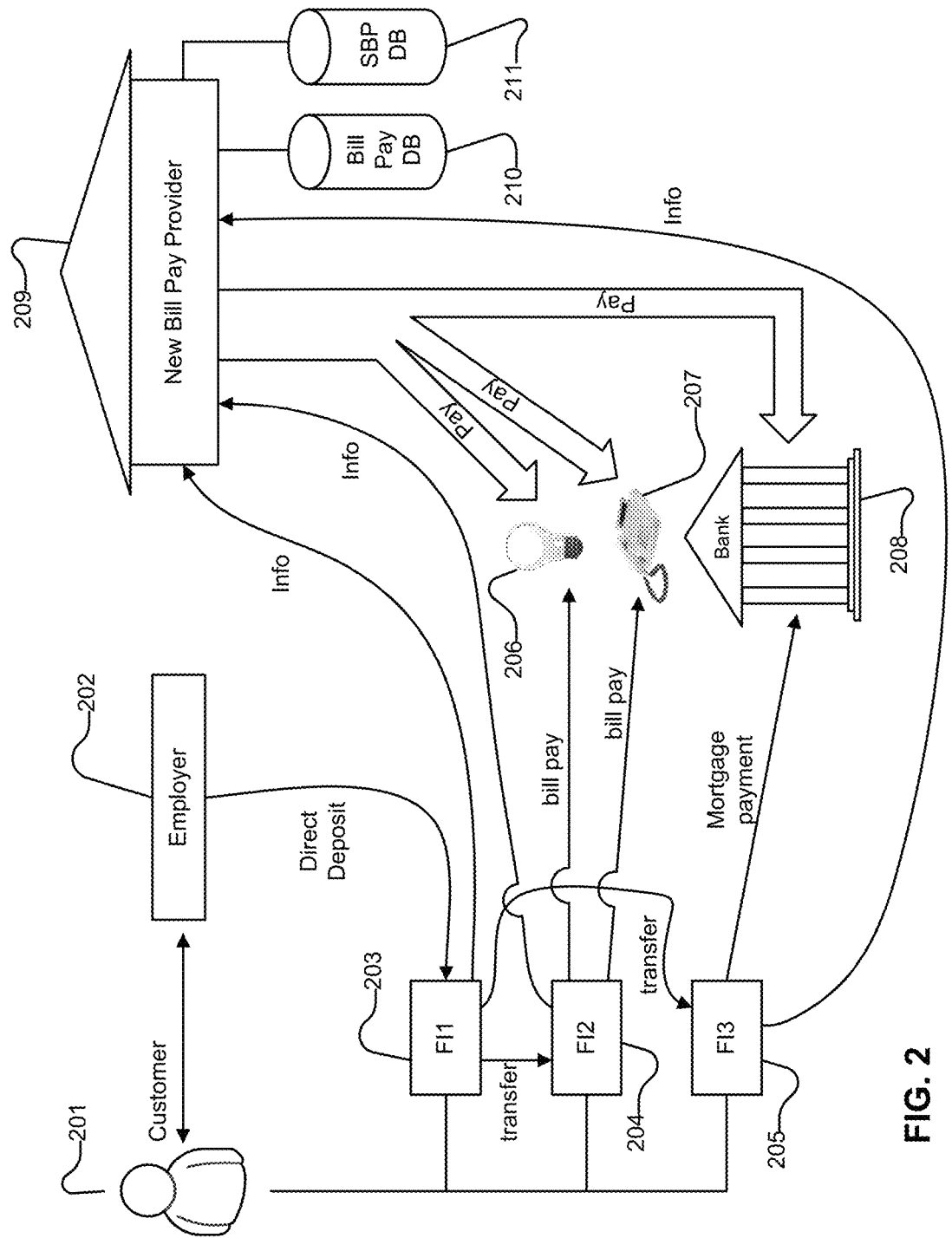
FIG. 2 depicts an example of relationships that may exist in one embodiment of the invention.

Referring to FIG. 2, an example of relationships that may exist in one embodiment of the invention is depicted. In this example, a customer 201 has established relationships or accounts with three different financial institutions, represented as FI1 (203), FI2 (204) and FI3 (205). The customer has a job and from her employer 202 she receives a periodic paycheck that is sent via direct deposit to FI1. The customer has also established an automated transfer of some funds to FI2 on a periodic basis. Further, the customer has established automated bill pays with FI2 to pay the electric company 206 and the phone company 207 on a monthly basis. The customer has also established an automated bill pay at FI3 to pay her mortgage payment at bank 208. When one example of the invention is implemented, the new bill pay provider 209 constructs a bill pay database 210 for the customer 201. When all approvals are met for transfer, then the new bill pay provider 209 will receive information from FI1, FI2 and FI3 from which a switched bill pay database 211 is constructed. Once the bill pays are transferred, then the new bill pay provider 209 will attend to automated payment of the customer's bills, in this example the electric bill, the phone bill and the mortgage payment.

In one example embodiment, a method for proactively obtaining authorization for and for performing automatic consumer bill pay migration in conjunction with the use of one or more computing devices which operate at least in part using computer software may include the steps of:

(a) utilize a computing device to detect accounts for which a customer is using an electronic bill pay service, (b) utilize a computing device to encourage the customer to switch all such bill pay accounts to a new bill pay service provider, (c) utilize a computing device to automatically facilitate the switch of the customer's bill pay accounts to the new bill pay service provider, and (d) utilize a computing device to verify that the customer's bill pay accounts at the new bill pay provider are correct.

In another example embodiment, a method for proactively encouraging and facilitating the transfer of a customer's computerized bill pay relationships to a new bill pay service provider may include the steps of:

(a) electronically detect accounts for which a customer is using an electronic bill pay service, (b) electronically identify all of such customer electronic bill pay accounts to the customer, (c) proactively encourage the customer to switch all such electronic bill pay accounts to a new bill pay service provider, (d) electronically facilitate the switch of the customer's electronic bill pay accounts to the new bill pay service provider, and (e) on a periodic or ongoing basis, review the customer's electronic bill pay accounts and verify that all such existing accounts have been switched to the new bill pay service provider.

Additionally or alternatively, in this example embodiment, the step of proactively encouraging the customer may be provided by offering a cash reward to the customer. Additionally or alternatively, in this example embodiment, the step of proactively encouraging the customer may be provided by offering a coupon to the customer. Additionally or alternatively, in this example embodiment, the step of proactively encouraging the customer may be provided by offering a discount to the customer. Additionally or alternatively, in this example embodiment, the step of proactively encouraging the customer may be provided by offering a free service to the customer. Additionally or alternatively, in this example embodiment, the step of proactively encouraging the customer may be provided by politely suggesting that the customer switch to an identified bill pay service provider.

In another example embodiment, a method for proactively obtaining a customer's consent to migration of bill pay accounts may include the steps of:

(a) using a computing device to identify a customer who has existing automatic bill pay relationships established, (b) using a computing device, detect all automated bill payments that the customer has established and store such information in a Bill Pay Database, (c) using a computing device to proactively incentivize the customer to authorize transfer of some or all accounts in the Bill Pay Database to a new bill pay service provider, (d) using a computing device to display bill pay relationships from the Bill Pay Database to the consumer, (e) using a computing device to obtain the consumer's consent to transfer the bill relationships display to the consumer in step (d) to the new bill pay service provider, (f) using a computing device to at least in part automatically transfer bill pay relationships authorized by the consumer in step (e) to the new bill pay service provider, (g) using a computing device to construct a Switched Bill Pay database of the transferred bill pay relationships from step (f), (h) using a computing device to verify accurate transfer of the bill pay relationship contained on the Switched Bill Pay database, and (i) allowing the consumer to monitor and manage automated bill pay relationships through the new bill pay service provider by use of a computing device.

In another example embodiment, and in conjunction with the use of a computing device, a computer software system, product and series of method steps may include: (a) detecting accounts for which a customer is using an electronic bill pay service; (b) encouraging the customer to switch all such bill pay transactions to a new bill pay service provider; (c) verifying the customer's accounts at the new bill pay provider; and (d) as desired, electronically or automatically facilitating the switch of said customer's bill pay accounts to the new bill pay service provider.

The invention has many uses across many industries, but is discussed herein with regard to a specific example of personal financial management software. Such specific discussion should not be considered to be limiting of the interpretation of the scope of the claims. Those skilled in the art will appreciate that variations and modifications may be made without departing from the principles of the invention as herein illustrated, described, and claimed. The present invention may be embodied in other specific forms without departing from its spirit or essential characteristics. All described embodiments are to be considered in all respects as only illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method for automated detection and migration of automated transactions, the method comprising:

providing automated transaction migration software running on a first server of a new account provider to a customer, wherein the software causes the first server to:

search through the customer's transactions of an old account of an old account provider on a second server of the old account provider to automatically detect an automated transaction of the customer;

receive, at the first server, transaction data associated with the automated transaction from the second server;

store the transaction data in an identified transaction database of the first server;

in response to the automatic detection of the automated transaction, proactively display at least a portion of the transaction data to the customer and proactively prompt the customer to authorize migration of the automated transaction from the old account provider to the new account provider;

in response to receiving authorization from the customer to migrate the automated transaction from the old account provider to the new account provider, automatically pre-populate a switched transaction database of the first server with the transaction data from the identified transaction database;

periodically, on an automated and ongoing basis, compare the identified transaction database to the switched transaction database to verify that the customer's identified automated transactions at the old account provider have been successfully migrated to the new account provider; and automatically correct errors in the switched transaction database in response to determining differences between automated transaction data in the identified transaction database and automated transaction data in the switched transaction database.

2. The method as recited in claim 1, wherein the searching through transactions of an old account of an old account provider on the second server includes searching through transactions in a past statement of the old account of the old account provider that is stored on the second server to automatically detect the automated transaction of the customer.

3. The method as recited in claim 1, wherein the automated transaction is an automated electronic bill pay transaction.

4. The method as recited in claim 1, wherein the automated transaction is an automated electronic direct deposit transaction.

5. The method as recited in claim 1, wherein the automated transaction is an automated electronic debit transaction.

6. The method as recited in claim 5, wherein the automated electronic debit transaction is payment of a regular periodic bill.

7. The method as recited in claim 1, wherein the automated transaction is an automated electronic transfer of funds from the old account to another account.

8. The method as recited in claim 7, wherein the automated electronic transfer of funds from the old account to another account is a regular periodic automated electronic transfer of funds from the old account to another account.

9. The method as recited in claim 1, wherein the proactive displaying of at least a portion of the transaction data to the customer and the proactive prompting of the customer to authorize migration of the automated transaction from the old account provider to the new account provider is performed by the software on a smart phone of the customer.

10. The method as recited in claim 1, wherein the software further causes the first server to:

periodically compare the identified transaction database to the switched transaction database to verify that all automated transactions that have been authorized for migration by the customer have indeed been migrated by having associated transaction data stored in the switched transaction database.

11. A method for automated detection and migration of automated transactions, the method comprising:

providing automated transaction migration software running on a first server of a new account provider to a customer, wherein the software causes the first server to:

search through the customer's transactions of an old account of an old account provider on a second server of the old account provider to automatically detect an automated transaction of the customer;

receive transaction data associated with the automated transaction from the second server;

store the transaction data in an identified transaction database of the first server;

in response to the automatic detection of the automated transaction, proactively display at least a portion of the transaction data to the customer and proactively prompt the customer to authorize migration of the automated transaction from the old account provider to the new account provider;

in response to receiving authorization from the customer to migrate the automated transaction from the old account provider to the new account provider, automatically pre-populate a switched transaction database of the first server with the transaction data from the identified transaction database;

periodically, on an automated and ongoing basis, compare the identified transaction database to the switched transaction database to verify that the customer's identified automated transactions at the old account provider have been successfully migrated to the new account provider; and automatically correct errors in the switched transaction database in response to determining differences between automated transaction data in the identified transaction database and automated transaction data in the switched transaction database.

12. The method as recited in claim 11, wherein the searching through transactions of an old account of an old account provider on a second server includes searching through transactions in a past statement of the old account of the old account provider that is stored on the second server to automatically detect the automated transaction of the customer.

13. The method as recited in claim 11, wherein the automated transaction is an automated electronic bill pay transaction.

14. The method as recited in claim 11, wherein the automated transaction is an automated electronic direct deposit transaction.

15. The method as recited in claim 11, wherein the automated transaction is an automated electronic debit transaction.

16. The method as recited in claim 15, wherein the automated electronic debit transaction is payment of a regular periodic bill.

17. The method as recited in claim 11, wherein the automated transaction is an automated electronic transfer of funds from the old account to another account.

18. The method as recited in claim 17, wherein the automated electronic transfer of funds from the old account to another account is a regular periodic automated electronic transfer of funds from the old account to another account.

19. The method as recited in claim 11, wherein the proactive displaying of at least a portion of the transaction data to the customer and the proactive prompting of the customer to authorize migration of the automated transaction from the old account provider to the new account provider is performed by the software on a smart phone of the customer.

20. The method as recited in claim 11, wherein the software further causes the first server to:

periodically compare the identified transaction database to the switched transaction database to verify that all transaction data contained in the switched transaction database is associated only with transactions that were indeed authorized for migration by the customer.

* * * * *